US010540497B2

(12) United States Patent
Nie (10) Patent No.: US 10,540,497 B2
(45) Date of Patent: Jan. 21, 2020

(54) METHOD AND APPARATUS FOR MONITORING SECURITY OF TERMINAL SYSTEM

(71) Applicant: Tencent Technology (Shenzhen) Company Limited, Shenzhen, Guangdong (CN)

(72) Inventor: Zixiao Nie, Guangdong (CN)

(73) Assignee: Tencent Technology (Shenzhen) Company Limited, Shenzhen, Guangdong (CN)

(*) Notice: Subject to any disclaimer, the term of this patent is extended or adjusted under 35 U.S.C. 154(b) by 280 days.

(21) Appl. No.: 15/366,597

(22) Filed: Dec. 1, 2016

(65) Prior Publication Data

US 2017/0083704 A1 Mar. 23, 2017

Related U.S. Application Data

(63) Continuation of application No. PCT/CN2015/080881, filed on Jun. 5, 2015.

(30) Foreign Application Priority Data

Jun. 5, 2014 (CN) .......................... 2014 1 0248183

(51) Int. Cl.
*G06F 21/56* (2013.01)
(52) U.S. Cl.
CPC .......... *G06F 21/562* (2013.01); *G06F 21/568* (2013.01)
(58) Field of Classification Search
None
See application file for complete search history.

(56) References Cited

U.S. PATENT DOCUMENTS

| 7,991,710 | B2 | 8/2011 | Palatucci et al. |
| 8,019,700 | B2 | 9/2011 | Provos et al. |
| 8,515,896 | B2 | 8/2013 | Zhou et al. |
| 8,904,536 | B2 | 12/2014 | Breitenbacher |
| 9,015,841 | B2 * | 4/2015 | Guo ...................... G06F 21/562 726/22 |
| 9,104,865 | B2 * | 8/2015 | Seacat Deluca ...... G06F 21/554 |
| 9,106,692 | B2 * | 8/2015 | Smith ................. H04L 63/1441 |

(Continued)

FOREIGN PATENT DOCUMENTS

| CN | 101013461 A | 8/2007 |
| CN | 101884047 A | 11/2010 |
| CN | 102203792 A | 9/2011 |

OTHER PUBLICATIONS

International Search Report of the ISA for PCT/CN2015/080881, Haidian District, Beijing, dated Sep. 2, 2015.

*Primary Examiner* — Christopher A Revak
(74) *Attorney, Agent, or Firm* — Harness, Dickey & Pierce, P.L.C.

(57) ABSTRACT

Disclosed is a method for monitoring security of a terminal system, including the following steps: monitoring a current running program in real time, and determining whether there is a security risk in the current running program; acquiring a corresponding preset risk score according to a type of the security risk, and adding the corresponding preset risk score to an accumulative risk score when there is the security risk in the current running program; and performing a risk prompt and a static scanning prompt when the accumulative risk score is greater than or equal to a risk threshold.

12 Claims, 7 Drawing Sheets

(56) References Cited

U.S. PATENT DOCUMENTS

| | | |
|---|---|---|
| 10,320,819 B2* | 6/2019 | Watson ............... G06N 3/0445 |
| 2009/0094175 A1 | 4/2009 | Provos et al. |
| 2009/0094697 A1 | 4/2009 | Provos et al. |
| 2010/0058473 A1 | 3/2010 | Breitenbacher |
| 2011/0131658 A1* | 6/2011 | Bahl ..................... G06F 21/577 |
| | | 726/25 |
| 2012/0005753 A1 | 1/2012 | Provos et al. |
| 2012/0144492 A1 | 6/2012 | Griffin et al. |
| 2012/0311707 A1 | 12/2012 | Provos et al. |
| 2019/0281076 A1* | 9/2019 | Watson ............... G06N 3/0445 |

* cited by examiner

METHOD AND APPARATUS FOR MONITORING SECURITY OF TERMINAL SYSTEM

CROSS REFERENCE TO RELATED APPLICATION

The present application is a continuation of International Application No. PCT/CN2015/080881, filed on Jun. 5, 2015, which claims priority to Chinese Patent Application No. 201410248183.9, filed on Jun. 5, 2014 with the State Intellectual Property Office of People's Republic of China, both of which are incorporated herein by reference in their entireties.

FIELD OF THE TECHNOLOGY

The present disclosure relates to the field of computer technologies, and in particular, to a method and an apparatus for monitoring security of a terminal system.

BACKGROUND OF THE DISCLOSURE

With widespread application of intelligent terminals and rapid development of the Internet, security of a terminal system becomes one of issues that people mainly pay attention to. Currently, common security monitoring for the terminal system mainly includes two manners. One is real-time monitoring: a triggered system event is captured in real time by security software; risk determining is performed; and a risk behavior is informed in time when a risk happens, which has a high sensitivity. The other is static scanning: a system file is scanned by means of human active triggering of security software; and virus scanning and killing is implemented, which has a strong scanning capability and can capture all risks on a terminal.

However, there are still some drawbacks in these two defense manners. Although the real-time monitoring can instantly inform a user when a risk happens, a message box pops up regardless of a harmful degree of the risk, and too many popup windows easily cause troubles for the user. Moreover, the real-time monitoring can only perform notification and processing on a detected malicious behavior triggered, and another malicious program that is related to the malicious behavior but is not triggered yet cannot be completely removed. However, although the static scanning has a strong scanning and killing capability, a user is required to manually start or set a function of timing starting of static scanning, which has a low relevance to a malicious behavior detected in real time.

SUMMARY

Embodiments of the present invention provide a method and an apparatus for monitoring security of a terminal system, which can control security notification according to harmful degrees of risks, combine real-time monitoring and static scanning, and improve security of the system.

An embodiment of the present invention proposes a method for monitoring security of a terminal system, including the following steps:

monitoring a current running program in real time, and determining whether there is a security risk in the current running program;

acquiring a corresponding preset risk score according to a type of the security risk, and adding the corresponding preset risk score to an accumulative risk score when there is the security risk in the current running program; and performing a risk prompt and a static scanning prompt when the accumulative risk score is greater than or equal to a risk threshold.

An embodiment of the present invention further proposes an apparatus for monitoring security of a terminal system, including:

a risk monitoring module, configured to monitor a current running program in real time, and determine whether there is a security risk in the current running program;

a risk score counting module, configured to acquire a corresponding preset risk score according to a type of the security risk, and add the corresponding preset risk score to an accumulative risk score when there is the security risk in the current running program; and a prompt module, configured to perform a risk prompt and a static scanning prompt when the accumulative risk score is greater than or equal to a risk threshold.

In the embodiments of the present invention, the real-time monitoring for a running program of a terminal system is used; a risk score is counted according to a degree of a risk when a risky program is detected; it is determined that security of a current running environment of the terminal system is poor when an accumulative risk score reaches a risk threshold; and it is needed to prompt the user to scan and kill virus in time. Because a risk score is determined, which is beneficial to accurately determining the security of the current running environment of the terminal system, the user is notified in time only when the security is poor. Troubles for the user caused by frequent notification are avoided; meanwhile timeliness of the real-time monitoring and a strong scanning and killing capability of the static scanning are also effectively combined; and security of the terminal system is further improved.

Objective achievement, functional features, and advantages of the present disclosure are further described in combination with the embodiments and the accompanying drawings.

DESCRIPTION OF EMBODIMENTS

It should be understood that the specific embodiments described herein are only intended to explain the present disclosure, but not intended to limit the present disclosure.

Figure 1:
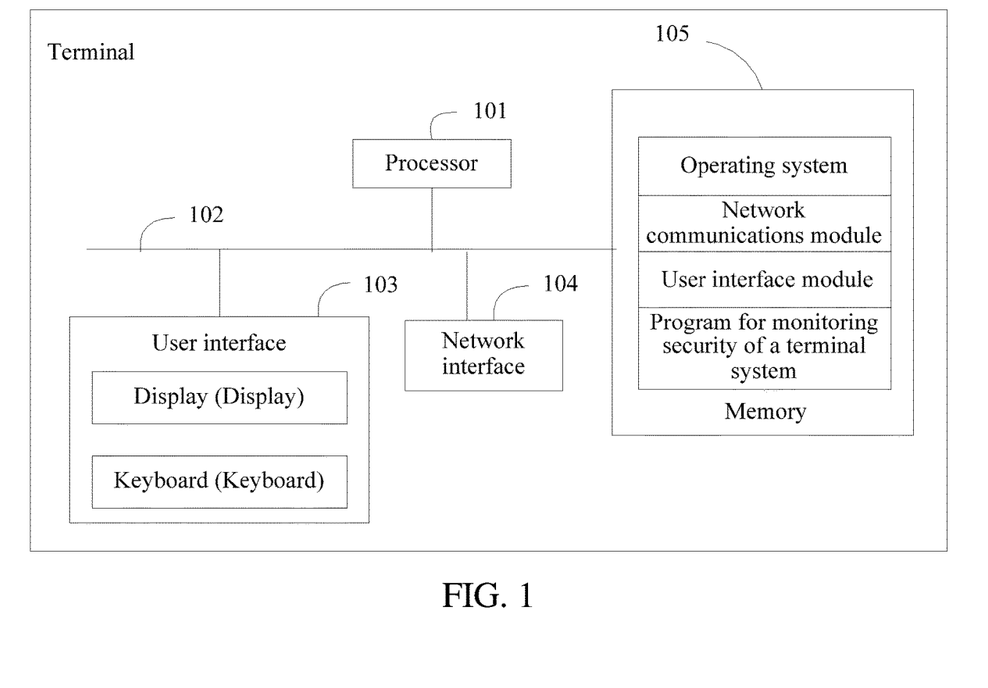
FIG. 1 is a schematic structural diagram of a terminal in which an apparatus for monitoring security of a terminal system is located according to an embodiment of the present invention.

As shown in FIG. 1, FIG. 1 is a diagram of a bus of a terminal in which an apparatus for monitoring security of a terminal system is located in an embodiment of the present invention. The terminal may include: at least one processor 101 such as a CPU, at least one network interface 104, a user interface 103, a memory 105, and at least one communications bus 102. The communications bus 102 is configured to implement connection and communication between these components. The user interface 103 may include a display, a keyboard, and may also include a standard wired interface and wireless interface. The network interface 104 may include a standard wired interface and wireless interface (such as a WIFI interface). The memory 105 may be a high-speed RAM memory, and may also be a non-volatile memory such as at least one magnetic disk memory. The memory 105 may also be at least one storage apparatus located far away from the processor 101 described above. The memory 105, as a computer storage medium, may include an operating system, a network communications module, a user interface module, and a security monitoring program of the terminal system.

In the terminal in which the apparatus for monitoring security of a terminal system is located shown in FIG. 1, the network interface 104 is configured to connect to a server and perform data communication with the server; the user interface 103 is used to receive user instructions and perform interaction with users; and the processor 101 can be configured to invoke a program for monitoring security of a terminal system stored in the memory 105 and perform the following operations:

monitoring a current running program in real time, and determining whether there is a security risk in the current running program;

acquiring a corresponding preset risk score according to a type of the security risk, and adding the corresponding preset risk score to an accumulative risk score when there is the security risk in the current running program; and performing a risk prompt and a static scanning prompt by using the user interface 103 when the accumulative risk score is greater than or equal to a risk threshold.

In an embodiment, the processor 101 invokes a program for monitoring security of a terminal system stored in the memory 105, and may also perform the following operations:

performing security scanning and virus scanning and killing on all programs and files in the terminal system when a static scanning instruction corresponding to the static scanning prompt is received.

In an embodiment, the processor 101 invokes a program for monitoring security of a terminal system stored in the memory 105, and may also perform the following operations:

performing security scanning and virus scanning and killing on all programs in which there is a security risk and associated programs and files when a static scanning instruction corresponding to the static scanning prompt is received.

In an embodiment, the processor 101 invokes a program for monitoring security of a terminal system stored in the memory 105, and may also perform the following operations:

determining whether the security scanning and the virus scanning and killing are being performed when there is the security risk in the current running program;

directly adding the current running program in which there is the security risk to a risk list of the security scanning and the virus scanning and killing if the security scanning and the virus scanning and killing are being performed; or acquiring a corresponding preset risk score according to a type of the security risk, and adding the corresponding preset risk score to an accumulative risk score if the security scanning and the virus scanning and killing are not being performed.

In an embodiment, the processor 101 invokes a program for monitoring security of a terminal system stored in the memory 105, and may also perform the following operations:

zeroing out the accumulative risk score after the security scanning and the virus scanning and killing are completed.

In this embodiment, the terminal in which the apparatus for monitoring security of a terminal system is located shown in FIG. 1 uses real-time monitoring for a running program of the terminal system; a risk score is counted according to a degree of a risk when a risky program is detected; it is determined that security of a current running environment of the terminal system is poor when an accumulative risk score reaches a risk threshold; and it is needed to prompt a user to scan and kill virus in time. Because a risk score is determined, which is beneficial to accurately determining the security of the current running environment of the terminal system, the user is notified in time only when the security is poor. Troubles for the user caused by frequent notification are avoided; meanwhile timeliness of the real-time monitoring and a strong scanning and killing capability of static scanning are also effectively combined; and security of the terminal system is further improved.

Figure 2:
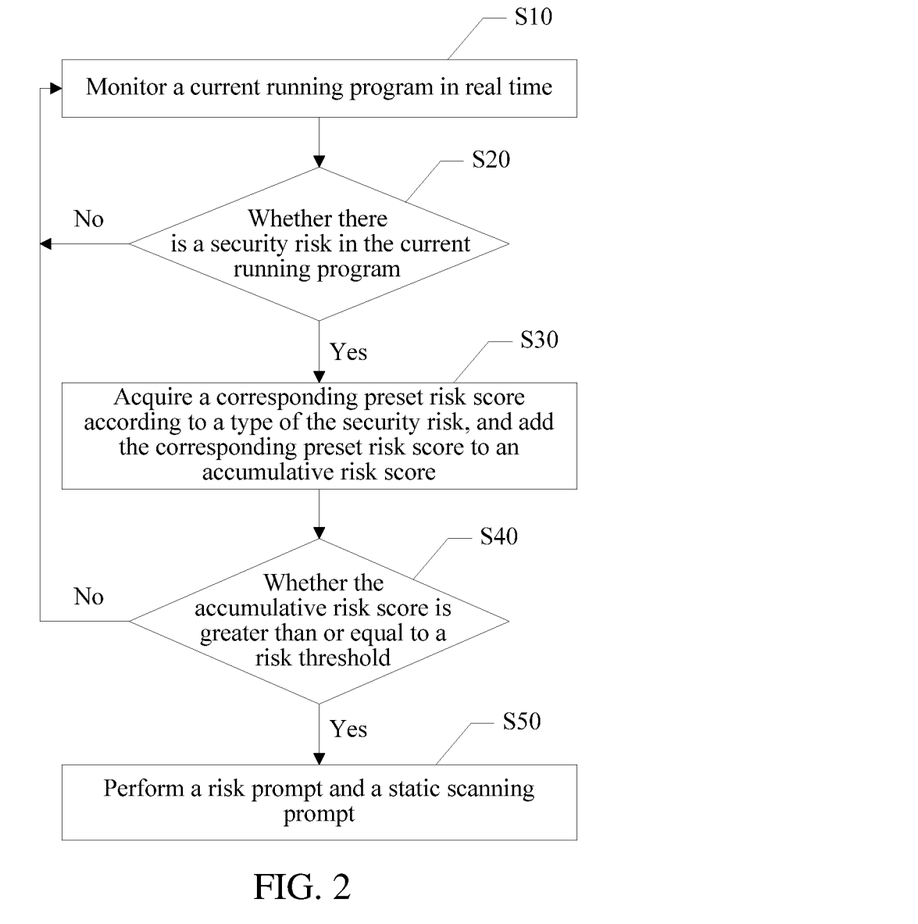
FIG. 2 is a flowchart of a first embodiment of a method for monitoring security of a terminal system in the present disclosure.

As shown in FIG. 2, FIG. 2 is a flowchart of a first embodiment of a method for monitoring security of a terminal system in the present disclosure. The method for monitoring security of a terminal system mentioned in this embodiment includes the following steps:

Step S10: Monitor a current running program in real time.

Step S20: Determine whether there is a security risk in the current running program, and perform step S30 if there is a security risk in the current running program, or go back to step S10 if there is no security risk in the current running program.

A program, including a system program, an application program, and the like, that is running in the terminal system are monitored in real time, for example file generation, process creating, and startup writing. Security risk analysis is performed on a detected program, and it is determined whether it is a malicious event, that is, whether there is a security risk.

Step S30: Acquire a corresponding preset risk score according to a type of the security risk, and add the corresponding preset risk score to an accumulative risk score.

Because harmful degrees of risks of different types are different, in order to estimate security of an environment of the terminal system, corresponding risk scores may be preset according to the harmful degrees of security risks of various types. A higher harmful degree indicates a bigger corresponding risk score. The risk score may also be replaced by a weight coefficient, and a higher harmful degree indicates a bigger corresponding risk weight coefficient. When the risk analysis is performed, an accumulative risk score for this time is acquired by adding a risk score corresponding to a risky program detected for this time to an accumulative risk score for the previous time. For example, three risky programs have been detected before monitoring for this time, and a sum of risk scores of the three risky programs is 8 points. One risky program is also detected for this time, and a risk score of the risky program is 3 points. A sum of accumulated risk scores is 11 points, that is, an accumulative risk score acquired after the monitoring for this time is 11 points. If there is no security risk in a running program analyzed for this time, a next running program is analyzed, and in this case, the accumulative risk score continues maintaining at 8 points.

Step S40: Determine whether the accumulative risk score is greater than or equal to a risk threshold, and perform step S50 if the accumulative risk score is greater than or equal to the risk threshold, or go back to step S10 if the accumulative risk score is not greater than or equal to the risk threshold.

A main objective of calculating the accumulative risk score is to determine security of a current running environment of the terminal system. In this embodiment, the risk threshold is preset, and the risk threshold is used as an alarm critical value. When the accumulative risk score reaches the risk threshold, it is considered that the security of the current running environment of the terminal system is poor; the system may have been invaded by virus; and virus scanning and killing need to be performed. If the accumulative risk score does not reach the risk threshold yet, it is considered that the terminal system is secure, and it is not needed to notify a user. For example, the preset risk threshold is 10 points. Three risky programs have been detected before monitoring for this time, and a sum of risk scores of the three risky programs is 8 points, which does not reach a score of the risk threshold; therefore, no prompt is needed. One risky program is also detected for this time, and a risk score of the risky program is 3 points. A sum of accumulated risk scores is 11 points, that is, an accumulative risk score acquired after the monitoring for this time is 11 points, which exceeds the preset risk threshold; therefore, the security of the current running environment of the terminal system is poor, and it is needed to prompt the user to scan and kill virus in time.

Step S50: Perform a risk prompt and a static scanning prompt.

When the user is prompted, a manner of displaying by using a prompt window may be used or manners of prompting by using both prompt window display and a sound alarm. By using the prompt window display as an example, the prompt window prompts that there is a high risk in the current running environment and suggests performing static scanning to removing virus completely. Meanwhile, an option control of the static scanning is further set in the prompt window to be directly clicked on by the user to enter the static scanning.

In this embodiment, real-time monitoring for a running program of the terminal system is used; a risk score is counted according to a degree of a risk when a risky program is detected; it is determined that security of a current running environment of the terminal system is poor when an accumulative risk score reaches a risk threshold; and it is needed to prompt the user to scan and kill virus in time. Because a risk score is determined, which is beneficial to accurately determining the security of the current running environment of the terminal system, the user is notified in time only when the security is poor. Troubles for the user caused by frequent notification are avoided; meanwhile timeliness of the real-time monitoring and a strong scanning and killing capability of static scanning are also effectively combined; and security of the terminal system is further improved.

Figure 3:
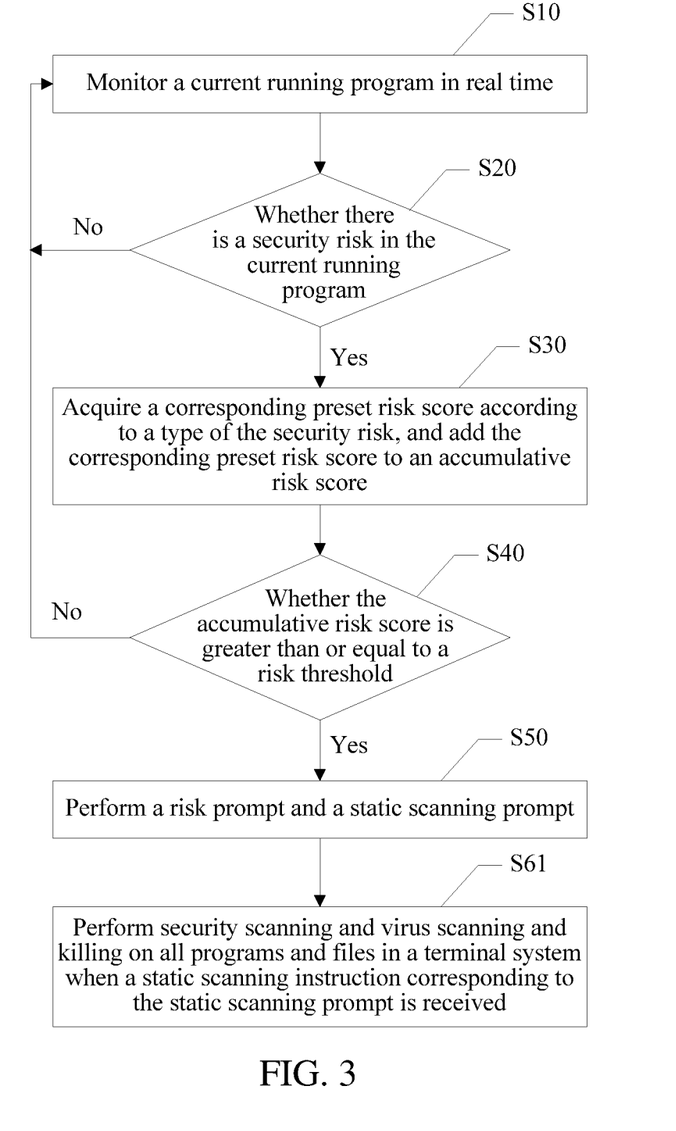
FIG. 3 is a flowchart of a second embodiment of a method for monitoring security of a terminal system in the present disclosure.

As shown in FIG. 3, FIG. 3 is a flowchart of a second embodiment of a method for monitoring security of a terminal system in the present disclosure. This embodiment includes all steps in the embodiment shown in FIG. 2, where after step S50, this embodiment further includes:

Step S61: Perform security scanning and virus scanning and killing on all programs and files in the terminal system when a static scanning instruction corresponding to the static scanning prompt is received.

A user clicks to enter a static scanning function according to an option control of static scanning displayed in a prompt window. When static scanning is performed, in order to scan and kill virus in the terminal system in all aspects, a complete scanning manner is used, that is, the security scanning and the virus scanning and killing are performed on all the programs and files in the terminal system, including a program that is running and a program that is not started yet, which is beneficial to screening all risks in the system and improving security of the terminal system.

Figure 4:
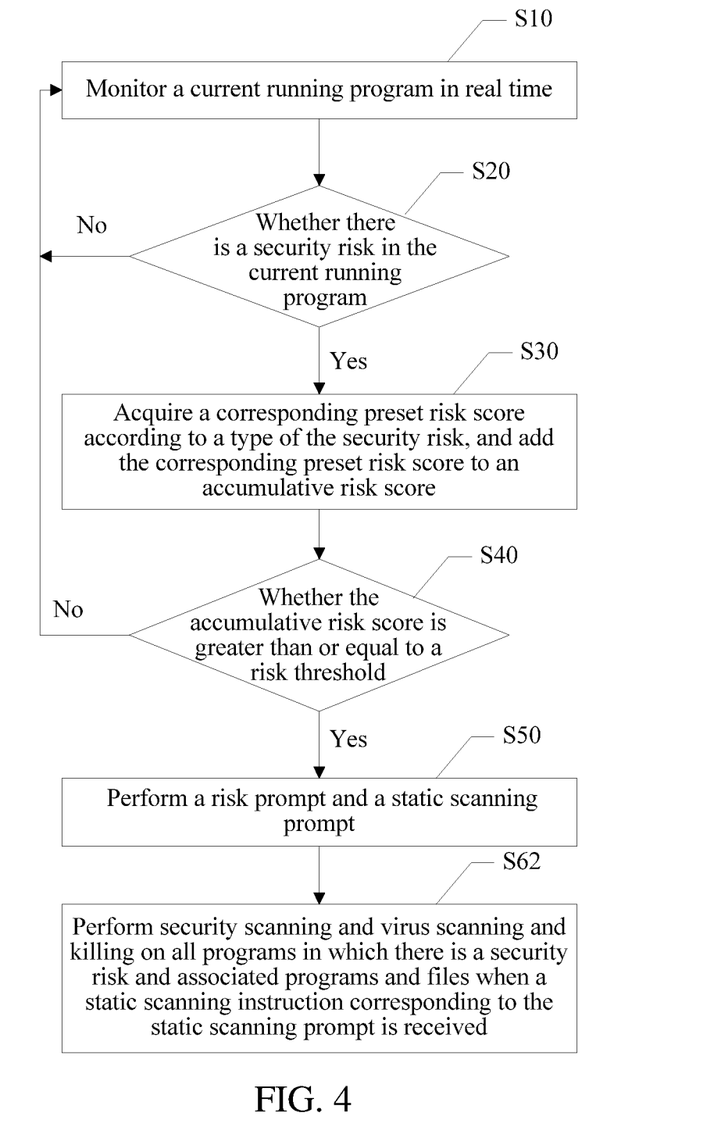
FIG. 4 is a flowchart of a third embodiment of a method for monitoring security of a terminal system in the present disclosure.

As shown in FIG. 4, FIG. 4 is a flowchart of a third embodiment of a method for monitoring security of a terminal system in the present disclosure. This embodiment also includes all the steps in the embodiment shown in FIG. 2, where after step S50, this embodiment further includes:

Step S62: Perform security scanning and virus scanning and killing on all programs in which there is a security risk and associated programs and files when a static scanning instruction corresponding to the static scanning prompt is received.

This embodiment differs from the embodiment shown in FIG. 3 in that when static scanning is performed, the scanning and the killing are performed on only risky programs detected in real time and associated programs and files; and virus are scanned and killed according to a range given by real-time monitoring, which is beneficial to improving efficiency of the security scanning and the virus scanning and killing, reducing memory occupied by the scanning and the killing, and improving a terminal processing speed.

Figure 5:
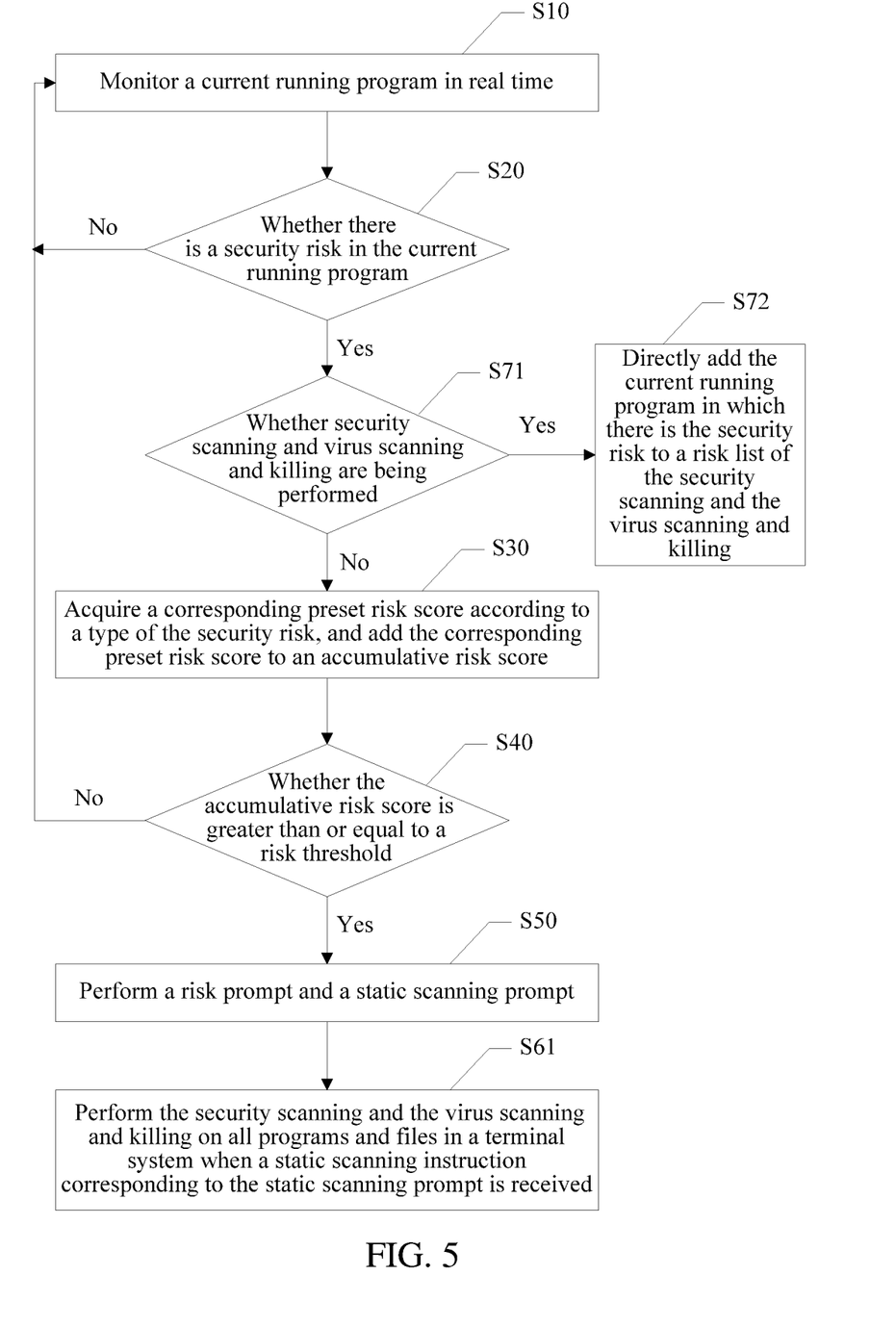
FIG. 5 is a flowchart of a fourth embodiment of a method for monitoring security of a terminal system in the present disclosure.

As shown in FIG. 5, FIG. 5 is a flowchart of a fourth embodiment of a method for monitoring security of a terminal system in the present disclosure. Steps added in this embodiment can be added to any one of the embodiments shown in FIG. 2 to FIG. 4. Adding to the embodiment shown in FIG. 3 is used as an example, and for the adding to the embodiments of FIG. 2 or FIG. 4, reference may be made to this embodiment. This embodiment includes all steps in the embodiment shown in FIG. 3, where after step S20, this embodiment further includes:

Step S71: Determine whether the security scanning and the virus scanning and killing are being performed when there is the security risk in the current running program, and perform step S72 if the security scanning and the virus scanning and killing are being performed, or perform step S30 if the security scanning and the virus scanning and killing are not being performed.

Step S72: Directly add the current running program in which there is the security risk to a risk list of the security scanning and the virus scanning and killing.

In a static scanning process, a real-time monitoring function can still proceed to monitor running programs and may proceed to find a risky program. In order to avoid troubles for a user caused by frequent risk prompts, a risk prompt is not performed on the risky program detected in the static scanning process, and the risky program detected in the static scanning process is directly added to the risk list in which static scanning is being performed. A static scanning function can directly perform the security scanning and the virus scanning and killing according to risk items in the risk list. In this way, not only the troubles for the user caused by the frequent risk prompts are avoided, but also screening of the risk items in the terminal system is implemented, and security of the terminal system is improved.

Figure 6:
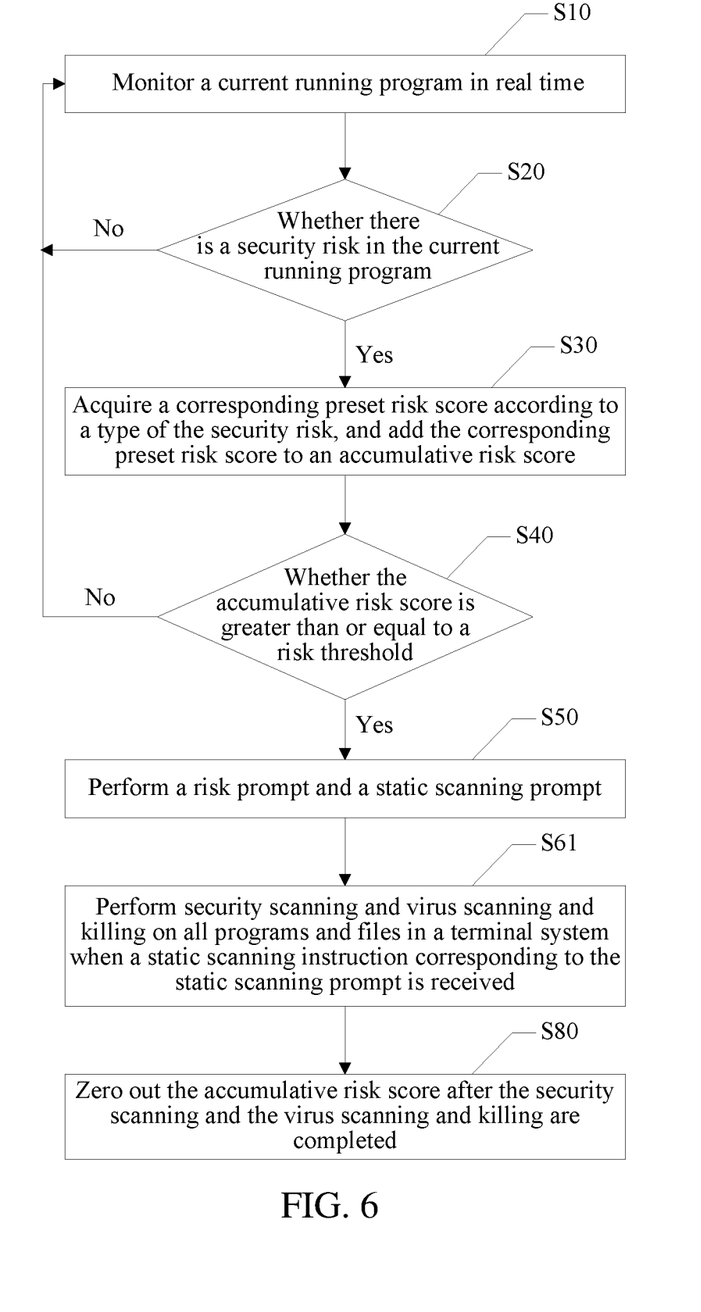
FIG. 6 is a flowchart of a fifth embodiment of a method for monitoring security of a terminal system in the present disclosure.

As shown in FIG. 6, FIG. 6 is a flowchart of a fifth embodiment of a method for monitoring security of a terminal system in the present disclosure. Steps added in this embodiment can be added to the embodiments shown in FIG. 3 or FIG. 4. Adding to the embodiment shown in FIG. 3 is used as an example, and for the adding to the embodiment of FIG. 4, reference may be made to this embodiment. This embodiment includes all steps in the embodiment shown in FIG. 3, where after step S61, this embodiment further includes:

Step S80: Zero out the accumulative risk score after the security scanning and the virus scanning and killing are completed.

After the security scanning and the virus scanning and killing are completed, the terminal system basically restores security. If subsequent real-time monitoring finds a risky program again, a risk score is recounted. Therefore, it is needed to zero out the accumulative risk score. For example, before static scanning, the accumulative risk score already reaches 11 points, which exceeds a risk threshold, and the system performs a risk prompt and a static scanning prompt. After the static scanning is completed, the real-time monitoring finds one risky program again, and a risk score of the risky program is 2 points. If the accumulative risk score is not zeroed out, an alarm prompt is performed again. However, a sum of actual risk scores is only 2 points. The system is in a low-risk environment, and it is not needed to perform an alarm. Therefore, in order to avoid troubles for a user caused by false alarms, it is needed to zero out the accumulative risk score in time after the static scanning.

Figure 7:
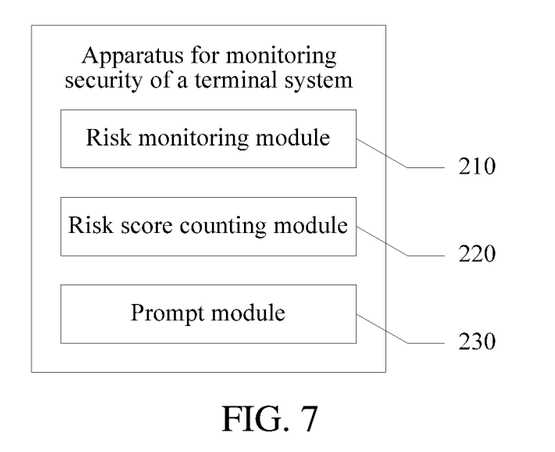
FIG. 7 is a schematic structural diagram of a first embodiment of an apparatus for monitoring security of a terminal system in the present disclosure.

As shown in FIG. 7, FIG. 7 is a schematic structural diagram of a first embodiment of an apparatus for monitoring security of a terminal system in the present disclosure. The apparatus for monitoring security of a terminal system mentioned in this embodiment includes:

a risk monitoring module 201, configured to monitor a current running program in real time, and determine whether there is a security risk in the current running program;

a risk score counting module 202, configured to acquire a corresponding preset risk score according to a type of the security risk, and add the corresponding preset risk score to an accumulative risk score when there is the security risk in the current running program; and a prompt module 203, configured to perform a risk prompt and a static scanning prompt when the accumulative risk score is greater than or equal to the a risk threshold.

A program that is running in the terminal system, including a system program, an application program, and the like, are monitored in real time, for example file generation, process creating, and startup writing. Security risk analysis is performed on a detected program, and it is determined whether it is a malicious event, that is, whether there is a security risk.

Because harmful degrees of risks of different types are different, in order to estimate security of an environment of the terminal system, corresponding risk scores may be preset according to the harmful degrees of security risks of various types. A higher harmful degree indicates a bigger corresponding risk score. The risk score may also be replaced by a weight coefficient, and a higher harmful degree indicates a bigger corresponding risk weight coefficient. When the risk analysis is performed, an accumulative risk score for this time is acquired by adding a risk score corresponding to a risky program detected for this time to an accumulative risk score for the previous time. For example, three risky programs have been detected before monitoring for this time, and a sum of risk scores of the three risky programs is 8 points. One risky program is also detected for this time, and a risk score of the risky program is 3 points. A sum of accumulated risk scores is 11 points, that is, an accumulative risk score acquired after the monitoring for this time is 11 points. If there is no security risk in a running program analyzed for this time, a next running program is analyzed, and in this case, the accumulative risk score continues maintaining at 8 points.

A main objective of calculating the accumulative risk score is to determine security of a current running environment of the terminal system. In this embodiment, the risk threshold is preset, and the risk threshold is used as an alarm critical value. When the accumulative risk score reaches the risk threshold, it is considered that the security of the current running environment of the terminal system is poor; the system may have been invaded by virus; and virus scanning and killing need to be performed. If the accumulative risk score does not reach the risk threshold yet, it is considered that the terminal system is secure, and it is not needed to notify a user. For example, the preset risk threshold is 10 points. Three risky programs have been detected before monitoring for this time, and a sum of risk scores of the three risky programs is 8 points, which does not reach a score of the risk threshold; therefore, no prompt is needed. One risky program is also detected for this time, and a risk score of the risky program is 3 points. A sum of accumulated risk scores is 11 points, that is, an accumulative risk score acquired after the monitoring for this time is 11 points, which exceeds the preset risk threshold; therefore, the security of the current running environment of the terminal system is poor, and it is needed to prompt the user to scan and kill virus in time.

When the user is prompted, a manner of displaying by using a prompt window may be used or manners of prompting by using both prompt window display and a sound alarm. By using the prompt window display as an example, the prompt window prompts that there is a high risk in the current running environment and suggests performing static scanning to removing virus completely. Meanwhile, an option control of the static scanning is further set in the prompt window to be directly clicked on by the user to enter the static scanning.

In this embodiment, real-time monitoring for a running program of the terminal system is used; a risk score is counted according to a degree of a risk when a risky program is detected; it is determined that security of a current running environment of the terminal system is poor when an accumulative risk score reaches a risk threshold; and it is needed to prompt the user to scan and kill virus in time. Because a risk score is determined, which is beneficial to accurately determining the security of the current running environment of the terminal system, the user is notified in time only when the security is poor. Troubles for the user caused by frequent notification are avoided; meanwhile timeliness of the real-time monitoring and a strong scanning and killing capability of static scanning are also effectively combined; and security of the terminal system is further improved.

Figure 8:
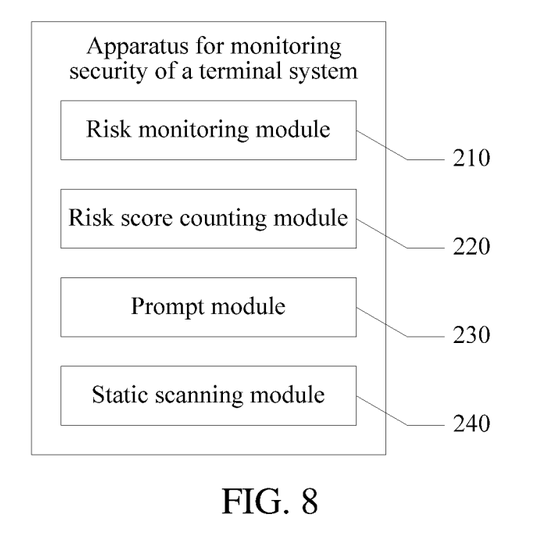
FIG. 8 is a schematic structural diagram of a second embodiment of an apparatus for monitoring security of a terminal system in the present disclosure.

As shown in FIG. 8, FIG. 8 is a schematic structural diagram of a second embodiment of an apparatus for monitoring security of a terminal system in the present disclosure. This embodiment includes all modules in the embodiment shown in FIG. 7. In order to scan and kill virus in all aspects, this embodiment further adds a static scanning module 204, configured to perform security scanning and virus scanning and killing on all programs and files in the terminal system when a static scanning instruction corresponding to a static scanning prompt is received.

A user clicks to enter a static scanning function according to an option control of static scanning displayed in a prompt window. When static scanning is performed, in order to scan and kill the virus in the terminal system in all aspects, a complete scanning manner is used, that is, the security scanning and the virus scanning and killing are performed on all the programs and files in the terminal system, including a program that is running and a program that is not started yet, which is beneficial to screening all risks in the system and improving security of the terminal system.

Further, in order to pertinently scan and kill the virus, the static scanning module 204 in this embodiment is different from a static scanning module 204 in the foregoing embodiment, and the difference lies in that:

the static scanning module 204 in this embodiment is configured to perform security scanning and virus scanning and killing on all programs in which there is a security risk and associated programs and files when the static scanning instruction corresponding to the static scanning prompt is received.

When the static scanning is performed, the scanning and the killing are performed on only risky programs detected in real time and the associated programs and files; and the virus are scanned and killed according to a range given by real-time monitoring, which is beneficial to improving efficiency of the security scanning and the virus scanning and killing, reducing memory occupied by the scanning and the killing, and improving a terminal processing speed.

Further, the static scanning module 204 is further configured to:

determine whether the security scanning and the virus scanning and killing are being performed when there is the security risk in the current running program; and directly add the current running program in which there is the security risk to a risk list of the security scanning and the virus scanning and killing when the security scanning and the virus scanning and killing are being performed.

In a static scanning process, a real-time monitoring function can still proceed to monitor running programs and may proceed to find a risky program. In order to avoid troubles for the user caused by frequent risk prompts, a risk prompt is not performed on the risky program detected in the static scanning process, and the risky program detected in the static scanning process is directly added to the risk list in which static scanning is being performed. A static scanning function can directly perform the security scanning and the virus scanning and killing according to risk items in the risk list. In this way, not only the troubles for the user caused by the frequent risk prompts are avoided, but also screening of the risk items in the terminal system is implemented, and security of the terminal system is improved.

Further, a risk score counting module 202 is further configured to zero out an accumulative risk score after the security scanning and the virus scanning and killing are completed.

After the security scanning and the virus scanning and killing are completed, the terminal system basically restores security. If subsequent real-time monitoring finds a risky program again, a risk score is recounted. Therefore, it is needed to zero out the accumulative risk score. For example, before the static scanning, the accumulative risk score already reaches 11 points, which exceeds a risk threshold, and the system performs a risk prompt and a static scanning prompt. After the static scanning is completed, the real-time monitoring finds one risky program again, and a risk score of the risky program is 2 points. If the accumulative risk score is not zeroed out, an alarm prompt is performed again. However, a sum of actual risk scores is only 2 points. The system is in a low-risk environment, and it is not needed to perform an alarm. Therefore, in order to avoid troubles for the user caused by false alarms, it is needed to zero out the accumulative risk score in time after the static scanning.

It should be noted that in the present specification, the terms "include", "comprise", and any variants thereof are intended to cover a non-exclusive inclusion. Therefore, in the context of a process, method, object, or device that includes a series of elements, the process, method, object, or device not only includes such elements, but also includes other elements not specified expressly, or may include inherent elements of the process, method, object, or apparatus. Unless otherwise specified, an element limited by "include a/an . . . " does not exclude other same elements existing in the process, the method, the object, or the apparatus that includes the element.

Sequence numbers of the foregoing embodiments of the present invention are just for description and do not represent the superiority or inferiority of the embodiments.

Based on the foregoing descriptions of the embodiments, a person skilled in the art may clearly understand that the methods in the foregoing embodiments may be implemented by software in addition to necessary universal hardware platforms or by hardware. However, software implementation is a better implementation manner in most cases. Based on such an understanding, the technical solutions of the present disclosure essentially, or the part contributing to the existing technology may be implemented in a form of a software product. The computer software product is stored in a storage medium (such as a ROM/RAM, a magnetic disk, or an optical disc), and includes several instructions for instructing a terminal device (which may be a mobile phone, a computer, a server, a network device, or the like) to perform the methods described in the embodiments of the present invention.

The foregoing descriptions are merely preferred embodiments of the present invention but are not intended to limit the patent scope of the present disclosure. Any equivalent modifications made to the structures or processes based on the content of the specification and the accompanying drawings of the present disclosure, or direct or indirect use in other related technical fields shall also fall within the patent protection scope of the present disclosure.

What is claimed is:

1. A method for monitoring security of a terminal system, comprising:

monitoring a current running program in real time;

determining whether there is a malicious event in the current running program;

in response to determining that the malicious event is in the current running program, determining whether security scanning and virus scanning and killing is being performed;

in response to determining that the security scanning and the virus scanning and killing is being performed, directly adding the current running program to a risk list of the security scanning and virus scanning and killing, wherein the risk list includes all programs on which the security scanning and virus scanning and killing is performed; and in response to determining that the security scanning and the virus scanning and killing is not being performed:
    acquiring a preset risk score corresponding to a type of the malicious event when there is the malicious event in the current running program;
    updating an accumulative risk score by adding the preset risk score to the accumulative risk score; and
    performing a risk prompt and a static scanning prompt when the accumulative risk score is greater than or equal to a risk threshold.

2. The method for monitoring security of a terminal system of claim 1, wherein after performing the risk prompt and the static scanning prompt, the method comprises:
    performing the security scanning and virus scanning and killing on all programs and files in the terminal system when a static scanning instruction corresponding to the static scanning prompt is received.

3. The method for monitoring security of a terminal system of claim 1, wherein after performing the risk prompt and the static scanning prompt, the method further comprises:
    performing the security scanning and virus scanning and killing on all programs in which there is a malicious event and associated programs and files when a static scanning instruction corresponding to the static scanning prompt is received.

4. The method for monitoring security of a terminal system of claim 2, wherein after performing the security scanning and virus scanning and killing, the method comprises:
    zeroing out the accumulative risk score after the security scanning and virus scanning and killing is completed.

5. An apparatus for monitoring security of a terminal system, comprising one or more processors and a non-transitory computer readable medium having a plurality of computer readable instructions stored thereon that, when executed by the one or more processors, cause the one or more processors to:
    monitor a current running program in real time;
    determine whether there is a malicious event in the current running program;
    in response to determining that the malicious event is in the current running program, determine whether security scanning and virus scanning and killing is being performed;
    in response to determining that the security scanning and virus scanning and killing is being performed, directly add the current running program to a risk list of the security scanning and virus scanning and killing, wherein the risk list comprises all programs on which the security scanning and virus scanning and killing is performed; and
    in response to determining that the security scanning and virus scanning and killing is not being performed:
        acquire a preset risk score corresponding to a type of the malicious event when there is the malicious event in the current running program;
        update an accumulative risk score by adding the preset risk score to the accumulative risk score; and
        perform a risk prompt and a static scanning prompt when the accumulative risk score is greater than or equal to a risk threshold.

6. The apparatus for monitoring security of a terminal system of claim 5, wherein the computer readable instructions further cause the one or more processors to:
    perform the security scanning and virus scanning and killing on all programs and files in the terminal system when a static scanning instruction corresponding to the static scanning prompt is received.

7. The apparatus for monitoring security of a terminal system of claim 5, wherein the computer readable instructions further cause the one or more processors to:
    perform the security scanning and virus scanning and killing on all programs in which there is a malicious event and associated programs and files when a static scanning instruction corresponding to the static scanning prompt is received.

8. The apparatus for monitoring security of a terminal system of claim 6, wherein the computer readable instructions further cause the one or more processors to:
    zero out the accumulative risk score after the security scanning and virus scanning and killing is completed.

9. A non-transitory computer readable storage medium storing computer executable instructions that, when executed by a processor, the computer executable instructions perform a method for monitoring security of a terminal system, the method for monitoring security of a terminal system comprising:
    monitoring a current running program in real time;
    determining whether there is a malicious event in the current running program;
    in response to determining that the malicious event is in the current running program, determining whether security scanning and virus scanning and killing is being performed;
    in response to determining that the security scanning and virus scanning and killing is being performed, directly adding the current running program to a risk list of the security scanning and virus scanning and killing, wherein the risk list comprises all programs on which the security scanning and virus scanning and killing is performed; and
    in response to determining that the security scanning and virus scanning and killing is not being performed:
        acquiring a preset risk score corresponding to a type of the malicious event when there is the malicious event in the current running program;
        updating an accumulative risk score by adding the preset risk score to the accumulative risk score; and
        performing a risk prompt and a static scanning prompt when the accumulative risk score is greater than or equal to a risk threshold.

10. The non-transitory computer readable storage medium of claim 9, wherein after performing the risk prompt and the static scanning prompt, the method comprises:
    performing the security scanning and virus scanning and killing on all programs and files in the terminal system when a static scanning instruction corresponding to the static scanning prompt is received.

11. The non-transitory computer readable storage medium of claim 9, wherein after performing the risk prompt and the static scanning prompt, the method comprises:
    performing the security scanning and virus scanning and killing on all programs in which there is a malicious event and associated programs and files when a static scanning instruction corresponding to the static scanning prompt is received.

12. The non-transitory computer readable storage medium of claim 10, wherein after performing the security scanning and virus scanning and killing, the method comprises:
    zeroing out the accumulative risk score after the security scanning and virus scanning and killing is completed.

* * * * *